March 11, 1947.   A. E. REEVES   2,417,125
CAMERA VIEW FINDER
Filed Aug. 25, 1943   4 Sheets-Sheet 2

INVENTOR
Arthur E. Reeves
BY John Flam
ATTORNEY

March 11, 1947.  A. E. REEVES  2,417,125
CAMERA VIEW FINDER
Filed Aug. 25, 1943    4 Sheets-Sheet 3
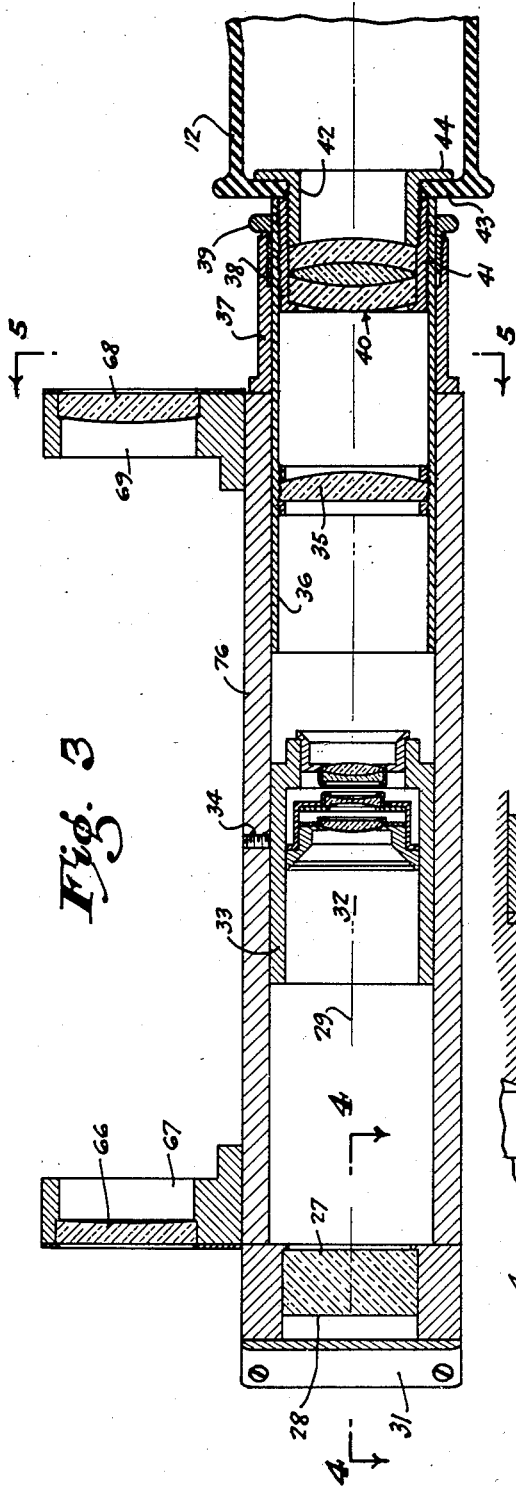
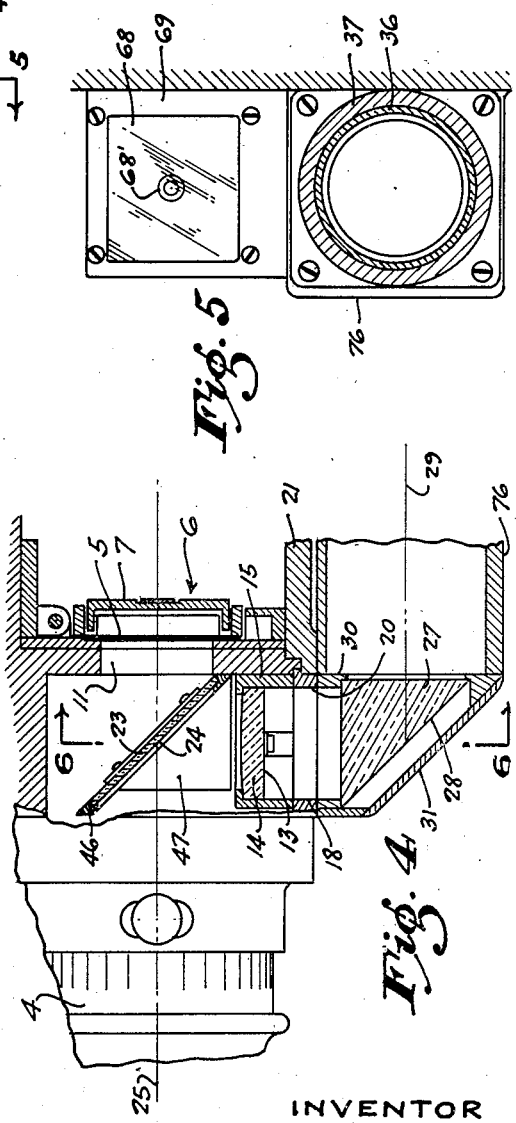
INVENTOR
Arthur E. Reeves
BY John Flam
ATTORNEY March 11, 1947. A. E. REEVES 2,417,125
CAMERA VIEW FINDER
Filed Aug. 25, 1943 4 Sheets-Sheet 4
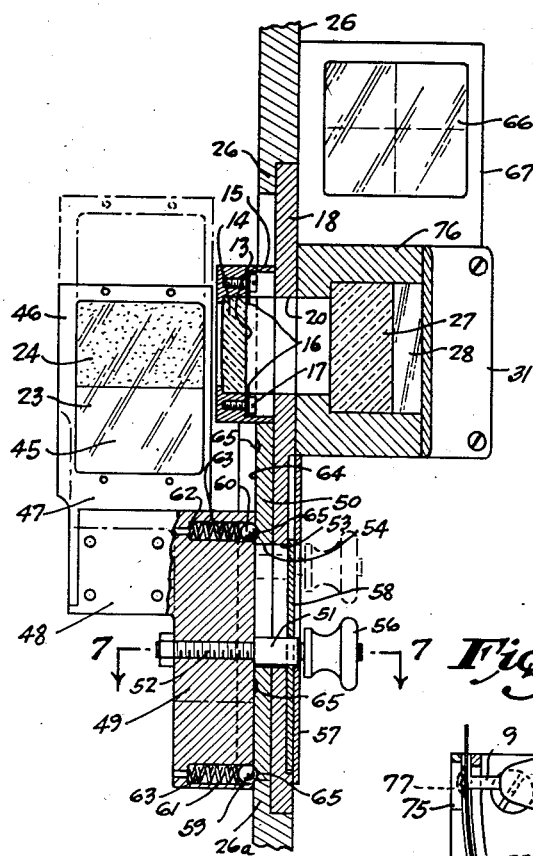
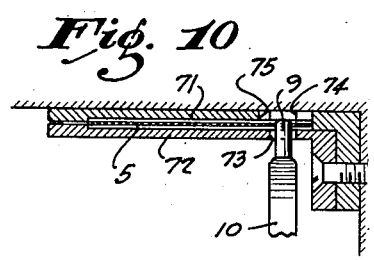
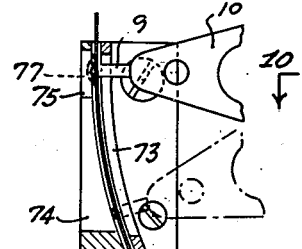
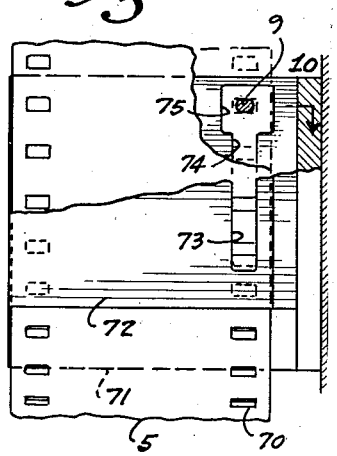
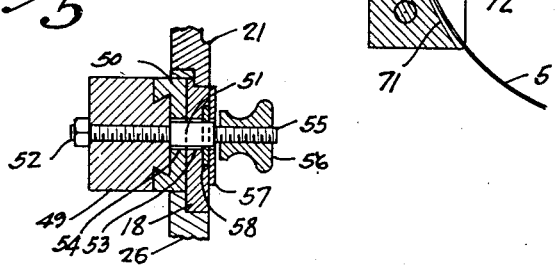
INVENTOR
Arthur E. Reeves
BY John Flam
ATTORNEY Patented Mar. 11, 1947

2,417,125

UNITED STATES PATENT OFFICE 2,417,125

CAMERA VIEW FINDER

Arthur E. Reeves, Los Angeles, Calif.

Application August 25, 1943, Serial No. 499,944

2 Claims. (Cl. 88—1.5)

This invention relates to a camera, and more particularly to view finding devices adapted for use with such cameras.

It is one of the objects of this invention to improve in general view finders adapted to be used with cameras.

In order that the exposures be in focus and that the images be in the desired position in the picture, it is important to provide a view corresponding as nearly as possible with the image cast upon the photosensitive surface.

In still cameras, such a result is approximated by arranging a mirror to be optionally interposed between the lens and the sensitive surface. In this way, the image that would otherwise be cast upon the sensitized surface is, instead, projected to the eye of the operator. It is essential in such devices to make it possible quickly to move the mirror into and out of operative relation, so the viewing and actual exposure be as nearly coincident as possible.

View finding in this manner, necessitating interposition of the mirror is accordingly disadvantageous, because there is an unavoidable time delay between the acts of viewing and exposing. This delay is often enough to cause the image that affects the sensitized surface to be out of focus; or, the field of the image may be different from that desired.

It is another object of this invention to obviate these disadvantages in a simple manner.

View finding for motion picture cameras is even more exacting, for exposures must be made in rapid succession. Satisfactory focusing and framing of the image under such circumstances require that there be a continuously effective view finder.

It is another object of this invention to make it possible continuously to view an image, even during exposure, substantially exactly as the image is cast upon the sensitized surface.

In order to accomplish this result, provisions are made to reflect a part of the beam focused by the lens of the camera to a view finding screen. This screen is so placed that the reflected beam is focused upon it. Enough light is permitted to pass, undeflected, to expose the picture effectively. Partial reflection of this character may be readily obtained by aid of a translucent member, such as a pellicle, or a thin plate of glass, either of which has a partially reflecting surface. Even a plain polished glass plate is often workable, for some specular reflection is obtained from its surface. However, a mirror layer, obtained as by depositing vaporized metal, can be used, and which is of such tenuous nature that a large portion of the illumination passes through the layer.

It is another object of this invention to make it possible to utilize a partially reflecting surface for continuous view finding while obviating the danger of fogging the sensitized surface.

It is still another object of this invention to adjust the view finder mechanism to render it optionally inactive, or, at least, to reduce the intensity of illumination cast upon the viewing screen.

It is still another object of this invention to make it possible to enlarge the image on the viewing screen if desired.

It is still another object of this invention to provide a supplemental view finder that forms an image of larger size than the image cast upon the sensitized surface.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 3 is a vertical sectional view of the view finder arrangement incorporating the invention;

Figs. 4 and 5 are sectional views, taken respectively along the planes 4—4 and 5—5 of Fig. 3;

Fig. 6 is a sectional view, taken along plane 6—6 of Fig. 4;

Fig. 7 is a detail sectional view, taken along plane 7—7 of Fig. 6;

Fig. 8 is an enlarged detail sectional view, illustrating the manner in which the motion picture film is intermittently advanced past the gate of the camera;

Fig. 9 is an elevation, partly broken away, of the apparatus illustrated in Fig. 8, viewed from the right; and, Fig. 10 is a sectional view, taken along plane 10—10 of Fig. 9.

In the form of the invention illustrated herein, a motion picture camera 1 (Figs. 1 and 2) is shown. A supply reel and a take-up reel are both enclosed in a reel housing 2, mounted on top of the motion picture camera proper. Furthermore, the motion picture camera is shown as provided with an adjustable lens mount 3, for optionally positioning any one of a number of lenses in operative position. In the position shown in Fig. 1, a lens assembly 4 is in position to focus an image on a sensitized surface.

Figure 2:
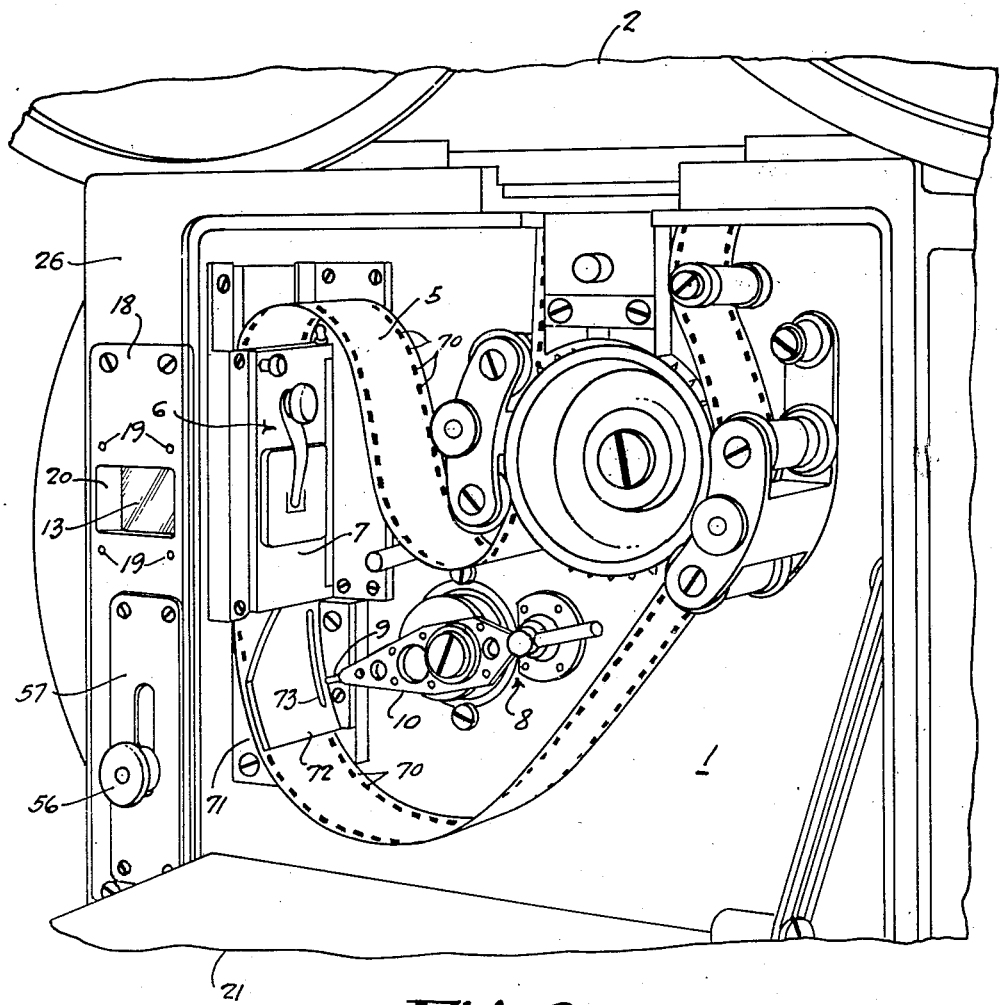
Fig. 2 is an enlarged pictorial view of the camera, showing a cover opened to illustrate the manner in which the motion picture film is fed past the gate.

As shown most clearly in Fig. 2, motion picture film 5 proceeds downwardly through a gate structure 6. This gate structure 6 is shown as provided with a pivoted door 7 for permitting threading of the film through the gate.

Furthermore, an intermittent mechanism 8 is provided for advancing the film 5. Such intermittent mechanisms are now well known. They usually include an eccentric mechanism operating to move an arm 10 (Figs. 2, 8, 9, and 10) to engage a perforation in the film by the aid of the pin extension 9, and to sweep downwardly after such engagement is effected. Each revolution of the intermittent mechanism causes cyclic performance of film advancement; that is, engagement of a film sprocket hole by pin 9, movement of the arm 10 in a counter-clockwise direction, as viewed in Fig. 2; and, finally, withdrawal of the pin 9 from the sprocket hole. Since mechanisms of this general character are now well known, further description thereof is unnecessary.

Figure 1:
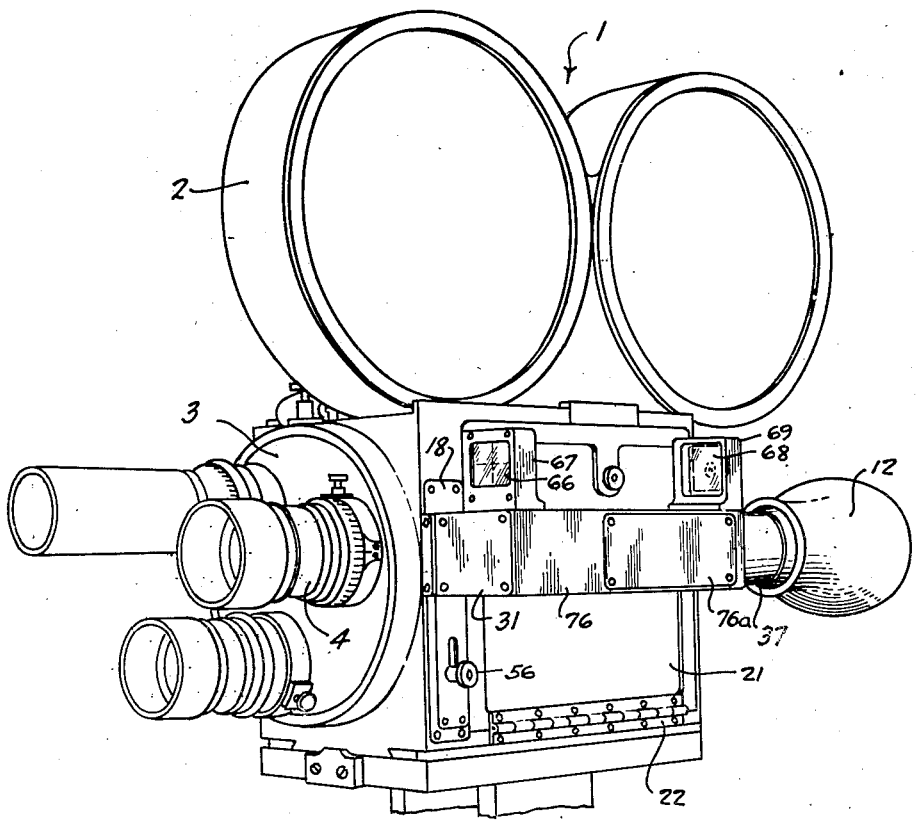
Figure 1 is a pictorial view of the camera with which the invention is associated.

The image to be cast upon the sensitized surface of film 5 is focused thereon by the aid of the lens assembly 4. The beam thus produced is arranged to pass through an aperture 11 (Fig. 4) formed in a wall of the camera, and immediately to the left of the gate structure 6. Another image for view finding purposes, substantially exactly as cast upon the sensitized surface of film 5, is also produced and may be viewed by the operator by applying his eye to a flexible rubber eye shield 12 (Figs. 1 and 3). The manner in which this is accomplished will now be described.

The arrangement is such that a portion of the beam forming the image on the sensitive surface may be reflected to form an image on a ground glass surface (Figs. 2, 4, and 6). Only a small fraction of the total light is required for this purpose, leaving a major part of the illumination to act upon the sensitive surface of the film proper. The ground glass surface 13 thus forms a viewing screen. It is shown as provided on a glass plate 14. This plate 14 is supported in a frame 15. It is held in place against one side of the frame by the aid of the overhanging retainers 16, held in place by the screws 17.

The frame 15 is appropriately mounted upon the inner surface of a metallic support or plate 18, as by the aid of the screws 19 (Fig. 2). This member 18 is shown as appropriately apertured, as at 20 (Figs. 4 and 6) to expose the screen surface 13. The plate 18 is shown as having an outer surface flush with the surface of wall 26. In order to prevent passage of light into the camera past the edges of plate 18, the plate is shown as overlapping the flange 26—a formed in wall 26. The right hand edge of plate 18 may constitute part of a door frame, as shown most clearly in Fig. 2. In this door frame is accommodated a door 21 hinged at its lower edge by the provision of a hinge structure 22 (Fig. 1).

Opening of the door 21 causes it to rest in a substantially horizontal position, as indicated in Fig. 2. In this position, the intermittent mechanism 8, the gate structure 6, and the film guides, etc., are exposed for the purpose of renewing or replacing the film, or for adjusting any of the working mechanism.

The reflection of part of the image forming beam emerging from the lens structure 4 is effected by a member 23 interposed in the beam, and that is partially reflecting and partially transmitting. This member 23 may be a film or pellicle made from transparent material and coated with a reflecting layer. In the present instance, it is shown as a thin plate of glass having a mirror surface 24 that only partially reflects the beam. This mirror surface may be formed by the vaporization of metal, and is so thin that most of the light passes through the plate 23 to affect the film 5. The surface 24 is properly disposed at an angle such as to throw the reflected portion of the beam transversely of the lens axis 25 and toward the screen surface 13. The screen surface 13 is placed in the focal plane to cause the image formed thereon to be in focus.

The glass plate 14 which provides the screen surface 13 may be slightly convex on that surface which is directed toward the member 23. By properly proportioning the curvature, a more uniform illumination can be cast upon the screen 13 without distortion of the image.

By the aid of an optical system, the image cast upon screen 13 may be viewed from the rear of the camera by the operator when he applies his eye to the eye shield 12. This optical system is shown generally as supported in a hollow tubular member 76 attached to the door 21. This member has an exterior cross section of rectangular form, and may be provided with a removable cover 76—a (Fig. 1). The optical system, incorporated in the tube 76 makes it possible to view the scene being photographed in a direction parallel to the axis of the lens 4.

The optical system is illustrated most clearly in Figs. 3, 4, 5, and 6. It includes a prism reflector 27. The oblique face 28 of this prism, forming the reflecting surface, serves to throw a beam in the direction of the axis 29 of the tube 76. The prism 27 may be appropriately supported at the left hand end of the tube 76 on a frame 30. This frame 30 is fastened to the end of tube 76 and is covered by the metal plate 31.

The optical system incorporated in tube 76 is such as to magnify the image reflected by the prism 27. For this purpose, there is an object lens system 32 (Fig. 3). This lens system is shown as supported in a barrel 33 adjustable in the tube 12. The system 32 is set so as to form an image in a plane to be magnified by a magnifying eye piece structure. In order to hold the optical lens system 32 in the adjusted position, a set screw 34 may be provided.

The eye piece magnifying system includes a collecting lens 35 fastened within the eye piece tube 36. This eye piece tube 36 is telescoped within a tubular gland structure 37. This structure 37 includes the packing 38 and the gland nut 39. The tube 36 can be adjusted by sliding it within the tube 76 and the member 37.

The eye piece lens system includes the three lenses indicated generally by the reference character 40. These lenses are held in place within the tube 36 by the lens mounting 41 and a flanged tube 42 that is provided with external threads engaging within the mounting 41. The eye shield 12 has a flange 43 that may be clamped between the flange 44 of the member 42 and the right hand edge of the mounting 41. Focusing of the eye piece may readily be accomplished by telescopically moving the eye piece tube 36 with the tubular member 76.

It may be desirable at times to render the view finder ineffective. This may be accomplished by moving the member 23 so that its reflecting surface 24 is out of the beam that casts the image upon the photo-sensitive surface. For this purpose the member 23 may be provided with a lower portion 45 (Fig. 6) that carries no reflecting layer. Accordingly, if the glass plate be moved upwardly to the dot-and-dash position illustrated in Fig. 6, the transparent portion 45 is substituted for the mirror surface 24. In this way, the amount of light reflected toward the screen 13 is materially reduced; but even this slight reflection from a transparent polished glass surface is sufficient to form a visible image on the screen 13.

Adjustment of the member 23 in this manner is readily accomplished by mounting the plate 23 in an adjustable frame 46. This frame 46 is fastened to a bracket 47 (Figs. 4 and 6). This bracket 47 is carried by a support 48 projecting from a slide 49. This slide 49, as shown most clearly in Fig. 7, is in dovetail connection with a guide 50. This guide 50 is fastened to the inner side of the plate 18.

To facilitate operation of the slide 49 along the guide 50, as well as to make it possible to hold the slide 49 in adjusted position, use is made of a rod 51. This rod 51 has a threaded extension 52, by the aid of which it may be attached to the slide 49. Rod 51 extends through slots 53 and 54, extending through the guide 50 and the plate 18. It is provided with another threaded extension 55 which is engaged by thumb nut 56. Thumb nut 56 serves as a handle for moving the slide 49, and it may be used to tighten the slide 49 in any position against the slotted cover plate 57. This cover plate 57 and the nut 56 are also shown in Fig. 2.

In order to prevent light from passing through the slots 53 and 54, a plate 58 is placed between the cover plate 57 and the plate 18. Rod 51 passes through a clearance aperture in plate 58. This plate 58 therefore moves with the slide 49 and covers the slots 53 and 54 at all times.

Provisions are made releasably to retain the slide 49 in either of its two positions by resilient means. Thus, the balls 59 and 60 (Fig. 6) are movable within appropriate cylindrical recesses 61 and 62 in the slide 49. They are urged toward the right by compression springs 63 and against a surface 64 of guide 50. This surface 64 is provided with a plurality of shallow recesses, such as 65, into which the balls 59 and 60 may project when they are in alinement with these recesses.

When the door 21 is open in the position shown in Fig. 2, the screen 13 is exposed, the optical system for magnifying the image on the screen being out of operative position. Closing of the door 21 to the position of Fig. 1 brings this optical system into operative relationship with the screen 13.

An auxiliary view finder system is provided and is supported on top of the tube 76. The forward portion of this view finder is formed as a negative lens 66 (Figs. 1, 3, and 6). This lens is supported in a frame 67 directly mounted on top of the tube 76. The image formed by lens 66 is magnified by a positive lens 68 (Figs. 1, 3, and 5) similarly supported in a frame 69 mounted on top of tube 76. In order to ensure alinement of the lens axes with the center of the image, an opaque annulus 68' is provided at the center of the lens 68.

Although in the present instance, the view finder systems are shown as applied to a motion picture camera, it is possible to utilize these systems for other types of cameras. In motion picture cameras, additional problems are encountered in intermittently moving the film 5 past the gate structure 6. This movement, as heretofore stated, is accomplished by entry of pin 9 (Fig. 2) into a perforation 70. If the sprocket perforations 70 are out of alinement with the direction of movement of the pin 9 (Figs. 2, 8, and 10) there is danger that the pin will strike film 5 at an unperforated place, and thereby cause injury to the film. By aid of the arrangement illustrated in Figs. 8, 9, and 10, injury to the film 5 is prevented even when the threading of the film 5 is such that the perforations 70 are not in exact alinement with the intermittent mechanism, including the arm 10 and pin 9.

Film 5 is guided between the two curved guide plates 71 and 72 (Figs. 8 and 10). Guide plate 72 is provided with the slot 73 so as not to interfere with movement of the pin 9 as it advances the film.

The guide plate 71 is also provided with a slot 74. However, where the pin 9 is arranged to be moved into engagement with a sprocket perforation 70, this slot 74 is considerably enlarged to form an open space 75 immediately back of the film. Thus, in the event a perforation 70 is not in alinement with the pin 9, this space 75 is large enough to cause merely a flexing of the film 5, as indicated at reference character 77. This flexing is not injurious, since pin 9 is of such length that it would project only slightly beyond the back of film 5. As the pin 9 moves down along the film 5, it will ultimately aline with one of the perforations 70. Then the film 5 snaps back into its unflexed position, and pin 9 is then in engagement with a sprocket perforation 70. If the slot 74 were narrow at the region where the pin 9 engages a sprocket aperture 70, there would be no opportunity for any material flexing of the film, and perforations would be punched in the film by movement of the pin 9. This provision of the enlarged space 75 at the region where the pin 9 moves into engagement with the film 5 prevents injury to the film.

The inventor claims:

1. In a view finder for a camera having a lens for transmitting a beam to a photo-sensitive surface, a transparent member having a partially reflecting and partially transmitting portion as well as a clear portion, said member being interposed between the lens and the surface said reflecting and transmitting portion being arranged to reflect a portion only of the light from the beam in a direction transverse to the beam, means forming a viewing screen upon which an image may be formed by said reflected light, means supporting the viewing screen, comprising a supporting guide for the member, and means manually operable from the exterior of the camera for moving said member along the guide.

2. In a view finder for a camera having a casing and a lens mounted on said casing for transmitting a light beam to a photo-sensitive surface in said casing, said casing having an opening through which the interior of the casing is accessible: a cover for the opening capable of being moved to closed or to open positions; a thin light transmitting member interposed between said lens and said surface, a portion of said member being transparent and capable of transmitting substantially all of the light of said beam toward the sensitive surface, another portion of said member being partly reflecting and partly light transmitting, the surface of said member presented to the beam being oblique so that, when the partly reflecting portion is active, a part of the light of the beam is reflected in a direction transverse to the beam; means supported by the casing and capable of operation externally of the casing for positioning said member optionally to pass substantially all of the light of the beam toward the sensitive surface, or to cause a part of the beam to be reflected; means forming a viewing screen in the path of the reflected light from the member, supported in fixed position by the casing and in position to bring the reflected part of the beam into focus on the screen, said screen being exposed in the opening of the case; a tube mounted on the cover and having an extension overlying the screen; a reflector in said extension for passing the reflected portion of the beam along the tube; and an eyepiece at the other end of the tube.

ARTHUR E. REEVES.

REFERENCES CITED

The following references are of record in the file of this patent:

UNITED STATES PATENTS

| Number | Name | Date |
|---|---|---|
| 1,484,584 | Tauern et al. | Feb. 19, 1924 |
| 1,897,268 | Merle | Feb. 14, 1933 |
| 2,012,514 | Mitchell | Aug. 27, 1935 |
| 2,218,763 | Mery | Oct. 22, 1940 |
| 1,930,723 | Mitchell | Oct. 17, 1933 |
| 1,698,333 | Howell | Jan. 8, 1929 |
| 1,986,522 | Owens | Jan. 1, 1935 |
| 1,991,311 | Barbieri | Feb. 12, 1935 |
| 1,334,532 | Griffith | Mar. 23, 1920 |
| 1,962,321 | Moreno | June 12, 1934 |
| 2,303,767 | Simmon | Dec. 1, 1942 |
| 2,343,015 | Lewis | Feb. 29, 1944 |
| 1,682,139 | Mitchell | Aug. 28, 1928 |